(12) United States Patent
Lecomte et al.

(10) Patent No.: US 7,926,083 B2
(45) Date of Patent: *Apr. 12, 2011

(54) PROCESS AND ADAPTIVE AND PROGRESSIVE SYSTEM FOR THE SECURED DISTRIBUTION OF FIXED PICTURES CODED IN WAVELETS

(75) Inventors: Daniel Lecomte, Paris (FR); Daniela Parayre-Mitzova, Paris (FR); Jérôme Caporossi, Bourg-la-Reine (FR)

(73) Assignee: Querell Data Limited Liability Company, Dover, DE (US)

( * ) Notice: Subject to any disclaimer, the term of this patent is extended or adjusted under 35 U.S.C. 154(b) by 1402 days.

This patent is subject to a terminal disclaimer.

(21) Appl. No.: 10/542,963

(22) PCT Filed: Jan. 23, 2004

(86) PCT No.: PCT/FR2004/050027
§ 371 (c)(1),
(2), (4) Date: Sep. 7, 2005

(87) PCT Pub. No.: WO2004/068858
PCT Pub. Date: Aug. 12, 2004

(65) Prior Publication Data
US 2006/0184985 A1    Aug. 17, 2006

(30) Foreign Application Priority Data

Jan. 23, 2003 (FR) .................................... 03 00735
Feb. 11, 2003 (FR) .................................... 03 01620

(51) Int. Cl.
*H04N 7/173* (2006.01)
*G06K 7/36* (2006.01)

(52) U.S. Cl. .................... 725/116; 725/104; 382/232
(58) Field of Classification Search .............. 725/116, 725/91, 93; 348/575, 576, 580
See application file for complete search history.

(56) References Cited

U.S. PATENT DOCUMENTS

| 6,415,042 B1 * | 7/2002 | Shin .............................. 382/100 |
| 6,735,699 B1 * | 5/2004 | Sasaki et al. ...................... 726/28 |
| 6,760,481 B1 * | 7/2004 | Chebil et al. .................. 382/240 |

(Continued)

FOREIGN PATENT DOCUMENTS

| EP | 0 920 209 A1 | 6/1999 |
| EP | 1 011 269 A1 | 6/2000 |
| WO | WO 98/42098 A1 | 9/1998 |
| WO | WO9842098 * | 9/1998 |

OTHER PUBLICATIONS

Carsten Griwodz et al., "Protecting VoD the Easier Way", ACM Multimedia '98, Bristol, UK, Sep. 12-16, 1998, pp. 21-28.

(Continued)

*Primary Examiner* — Brian T Pendleton
*Assistant Examiner* — Jean D Saint Cyr
(74) *Attorney, Agent, or Firm* — Connolly Bove Lodge & Hutz LLP

(57) ABSTRACT

A process for secured distribution of digital fixed pictures in the form of streams comprising sequences of data each containing a part of information of the picture comprising: modifying the original stream by modifying at least a part of the data sequences to produces a stream modified in the same nominal format as the original stream, transmitting the modified stream, and reconstruction of the modified stream with a decoder in addressee equipment, wherein the reconstruction is adaptive and progressive as a function of information coming from a digital profile of an addressee user.

44 Claims, 1 Drawing Sheet

U.S. PATENT DOCUMENTS

| | | | |
|---|---|---|---|
| 6,873,744 B2 * | 3/2005 | Ottesen | 382/280 |
| 7,321,625 B2 * | 1/2008 | Zhang et al. | 375/240.11 |
| 7,333,610 B2 * | 2/2008 | Dallard et al. | 380/239 |
| 7,421,082 B2 * | 9/2008 | Kamiya et al. | 380/278 |
| 2002/0118859 A1 * | 8/2002 | Stone et al. | 382/100 |
| 2002/0133830 A1 * | 9/2002 | Kim et al. | 725/142 |
| 2003/0198403 A1 * | 10/2003 | Ottesen | 382/280 |
| 2004/0234147 A1 * | 11/2004 | Malvar | 382/240 |

OTHER PUBLICATIONS

Wenjun Zeng et al., "Efficient Frequency Domain Video Scrambling for Content Access Control", ACM Multimedia '99, Orlando, Florida, USA, Oct. 30, 1999, pp. 285-294.

Ahmet M. Eskicioglu et al., "An Integrated Approach to Encrypting Scalable Video", vol. 1, Aug. 26, 2002, pp. 573-576.

* cited by examiner

PROCESS AND ADAPTIVE AND PROGRESSIVE SYSTEM FOR THE SECURED DISTRIBUTION OF FIXED PICTURES CODED IN WAVELETS

Related Application

This is a §371 of International Application No. PCT/FR2004/50027, with an international filing date of Jan. 23, 2004 (WO 2004/68858, published Aug. 12, 2004), which is based on French Patent Application Nos. 03/00735, filed Jan. 23, 2003, and 03/01620, filed Feb. 11, 2003.

Field of the Invention

This invention relates to processing digital pictures/coded in wavelets and a system that permits visual scrambling and restoration in a progressive and adaptive manner of the original content of a fixed digital picture coded in wavelets.

Background

It has been a problem to furnish a process capable of transmitting in a secure manner digital data corresponding to high-quality pictures in any digital format stemming from a coding in wavelets either directly or pre-recorded to a viewing screen and/or for being recorded on the hard disk or other backup device belonging to a box connecting a telecommunication network to a screen of a monitor or television screen type while preserving the visual quality, but avoiding fraudulent use such as the possibility of making pirate copies of the digitally coded picture. The classic encryption techniques consist of a general manner in combining (according to operations of the addition or subtraction type) the original data with values generated in a pseudo-random manner and from an initialization key. The simple possession of this key therefore permits complete decryption of the encrypted data, which latter substantially contains the totality of the original information.

European patent application with the reference number EP 1011269A1 entitled "System for Processing an Information Signal" describes discloses a method for encrypting an information signal that can be applied to the case of fixed pictures. The method consists in of adding a pseudo-random noise to the non-compressed original signal in such a manner as to obtain a new signal. The encrypted signal encrypted in this manner is then compressed with the aid of adequate standard algorithms and then transmitted. As for the key, it is transmitted in a secure manner to the destination of the future user of the encrypted signal. This known method can be applied to the case of the pictures coded in accordance with the JPEG norm. However, there is no reference to the case of pictures coded by wavelets. Moreover, possession of the key conditions decryption of the transmitted signal.

The article "An Integrated Approach to Encrypting Scalable Video", Eskicioglu et al., Proceedings of the 2002 IEEE International Conference on Multimedia and Expo, Lausanne, Switzerland discloses a process for generating, managing and updating encryption keys used for protecting a multi-broadcasted binary stream coding a video sequence and presenting properties of scalability (multi-layer). The described protection system of the streams is a system in which each layer is encrypted with a different secret key, which key is known by a group of users and can change in a periodic manner over the course of time and as a function of the number of users. That system is therefore based on classic selective encryption technologies with the aid of one or several keys: All the data is presented in the protected stream and only it conditions access to the content and, as a consequence, does not resolve the problem of high security.

The article "Protecting VoD the Easier Way", Griwodz et al., Proceedings of the ACM Multimedia, September 1998, discloses a process for distribution via broadband networks or temporary servers and a point-to-point secure connection of protected multimedia contents whose access is controlled and traced. The initial stream coding the original audiovisual content is deliberately corrupted by a predetermined modification of certain bytes in the stream and a signal permitting its reconstruction is only transmitted subsequently to the client at the moment of the visualization of the content: A key is first sent to the client that permits recalculation of placement of the corrupted bytes in the stream. Then, a signal containing the original bytes is sent after encryption to reconstruct the initial stream. Reconstruction of the stream is therefore conditioned by a key and, consequently, the process does not contribute a high level of security.

SUMMARY OF THE INVENTION

This invention relates to a process for secured distribution of digital fixed pictures in the form of streams including sequences of data each containing a part of information of the picture including modifying the original stream by modifying at least a part of the data sequences, to produce a stream modified in the same nominal format as the original stream, transmitting the modified stream, and reconstructing the modified stream with a decoder in addressee equipment, wherein the reconstruction is adaptive and progressive as a function of information coming from a digital profile of an addressee user.

This invention also relates to the process wherein a stream reconstituted by descrambling has the same visual quality as the original stream and exists in a usable form only if it carries a trace.

DETAILED DESCRIPTION

Figure 1:
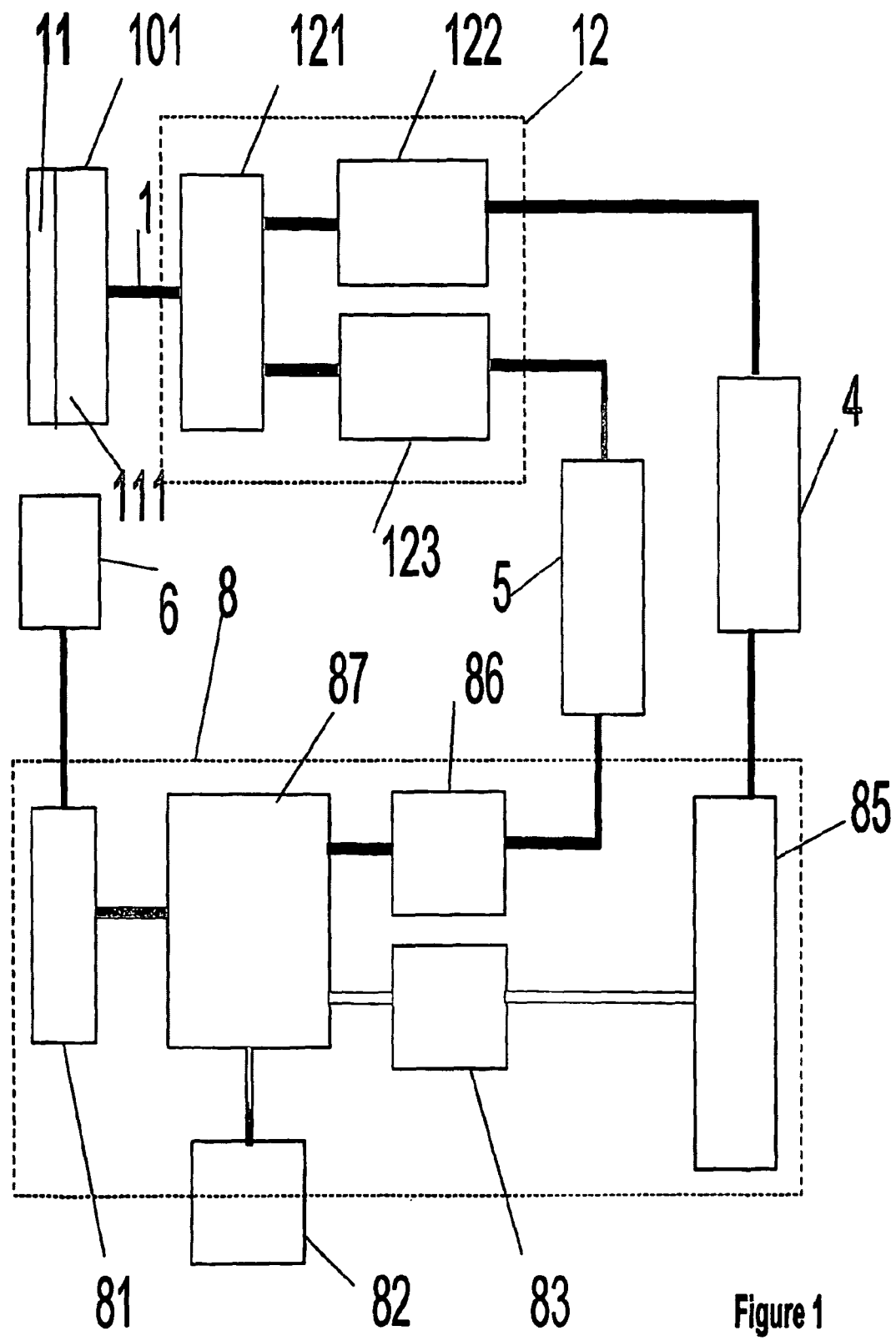
FIG. 1 is a schematic, block diagram of a system in accordance with aspects of the invention.

This invention refers to a device capable of transmitting in a secure manner a set of fixed digital pictures with a high visual quality to a display device and/or for being recorded in the memory of the backup device of a box connecting the telecommunication network to the display device while preserving visual quality and avoiding the possibility that these pictures can be copied in an illicit manner.

The invention concerns a process for the secured distribution of fixed digital pictures in accordance with a nominal format originating in wavelet coding represented by a binary stream constituted of at least one packet (relative to the organization of the binary sequence) containing at least one block grouping simple elements (e.g., coefficients) coded digitally in accordance with a method specified in the stream concerned and used by all the decoders capable of restoring it or decoding it to be able to display it correctly. This process comprises:

A preparatory stage comprising modifying at least one of the simple elements,

A stage for transmitting,

A main stream in conformity with the nominal format constituted of the blocks and packets modified in the course of the preparatory stage and By a path separate from the main stream of complementary digital information permitting reconstitution of the original stream from the calculation on the addressed equipment as a function of the main stream and of the complementary information. The complementary information is defined as a set constituted of data, e.g., coefficients describing the original digital stream or extracts of the original stream) and functions (e.g., the substitution or interchanging [swapping], permutation function). A function is defined as containing at least one instruction putting data and operators in a relationship. The complementary information describes the operations to he carried out to restore the original stream starting from the modified stream.

"Stream" is defined as a structured binary sequence constituted of simple and ordered elements representing data in coded form and responding to a given audiovisual standard or norm.

The fact of having removed part of the original data of the original stream during the generation of the modified main stream does not permit restitution of the original stream from only the data of the modified main stream. The modified main stream is then called a "secured stream". A "secured distribution" is a distribution of secured streams.

The term "scrambling" denotes modification of a digital binary stream in accordance with appropriate methods in such a manner that the stream remains in conformity with the standard with which it had been generated while rendering it decodable and displayable on a visual information screen coded by the stream, but altered from the viewpoint of human visual perception.

The term "descrambling" denotes the process of restitution by appropriate methods of the original stream, which video stream that is restituted after the descrambling is identical, that is, without loss, to the original video stream.

"Granular scalability" is defined from the English expression "granular scalability". Scalability is defined as the property that characterizes an encoder capable of encoding or a decoder capable of decoding an ordered set of binary streams in such a manner as to produce or reconstitute a sequence called a multi-layer sequence. "Granularity" is defined as the quantity of information that can be transmitted by each layer of a stream resulting from an encoding by layers, which stream is then also qualified as (granular). The scalabilities that are qualitative, spatial and in resolution are then defined. A stream has a "qualitative scalability" if it is organized according to an ordered structure of successive sub-layers whose addition permits improvement of the visual quality of the picture.

A stream has a "spatial scalability" if it is organized according to an ordered structure of blocks of data coding information that is locally spatial in the picture.

A stream has a "scalability in resolution" if it is organized according to an ordered structure of blocks of data coding information permitting the decoding of the picture at a fixed level of resolution.

"Scalability in resolution" is defined as the possibility of decoding the picture according to several layers of resolution starting from a single binary stream representing the picture encoded by wavelets.

A stream has a "spectral scalability" if it is organized according to an ordered structure of blocks of data coding information permitting the decoding of a multi-component picture according to a fixed component.

This invention provides protection of the digital picture coded in wavelets integrally based on the structure of the "bitstream" (binary sequence), which protection comprises modifying the targeted parts of the bitstream (relative to the modeling by wavelets) and its characteristics. Certain true values are extracted from the bitstream and stored as complementary information and random or calculated values or interchanged values are put in their places, which is done for the entire digital stream. Thus, the scrambler adds "decoys" for the decoder, that receives a binary stream at the input that is completely in conformity with the original digital format but from which the decoded and displayed picture is not acceptable from the viewpoint of human visual perception. The scrambling module makes an analysis of the bitstream and selects the locations of the bitstream where it introduces perturbations. A "perturbation" is defined as being a change (e.g., a change of value, sign inversion, saturation, thresholding) or a substitution by a random or calculated value or a permutation. The scrambling/descrambling process realized is without loss of quality for the original picture. The scrambling operation is advantageously also realized with a decoding/partial encoding of the bitstream representing the encoded picture.

The invention advantageously permits protection of a digital picture coded in a stream with a property of spatial scalability. The invention also advantageously permits protection of a digital picture coded in a stream with a property of scalability in resolution. The invention further advantageously permits protection of a digital picture coded in a stream with a property of scalability in quality. The invention still further advantageously permits protection of a digital picture coded in a stream with a property of spectral scalability.

The scrambling operation is also advantageously realized with a complete previous decoding of the bitstream representing the encoded picture, then a re-encoding before modification in a stream with properties of scalability.

Inversely to the majority of known encryption systems, the principle described above ensures a high level of protection while reducing the volume of information necessary for the decoding carried out in a progressive and adaptive manner.

The protection is based on the principle of the suppression and/or replacement of information coding the original visual signal by any method, whether: Substitution, modification, permutation or shifting of the information. This protection is also based on the knowledge of the structure of the stream at the output of the visual encoder: Scrambling is a function of the structure of the digital stream. Reconstitution of the original stream is carried out on the addressed equipment from the modified main stream already present or available (e.g., on a CD or DVD) or sent in real time to the addressed equipment and from the complementary information sent in real time at the moment of viewing comprising data and functions executed with the aid of digital routines (set of instructions).

Given knowledge of the manner with which the modeling, compression and encoding in wavelets of the picture are carried out by the wavelets coder and/or the given standard or norm, it is always possible to extract the main parameters from the bitstream that describe it and that are sent to the decoder.

Many scrambling systems have an immediate effect, that is to say, either the original stream is totally scrambled or the original stream is not scrambled at all, and likewise for the systems for descrambling the visual content. It is difficult with rigid systems of this type to satisfy the management of the rights of the users and the quality of service of multi-user, multi-application and multi-service client-server systems, that is to say, to adapt the services as a function of the different profiles of the users and their rights.

"Profile" of the user denotes a digital file comprising descriptors and information specific to the user, e.g., cultural preferences and cultural and social characteristics, habits of use such as the frequency of using viewing means, the average time of displaying scrambled and/or descrambled fixed pictures, the frequency of viewing a scrambled and/or descrambled sequence, or any other behavioral characteristic regarding the use of fixed pictures and successions of fixed pictures. This profile is formalized by a digital file or a digital table that can be used by computer means and is located in the server and/or the decoder box of the client.

"Hardware profile" of the user denotes a digital file comprising descriptors and information specific to the viewing hardware of the user, e.g., the resolution of his viewing screen, the calculating power of the fixed picture decoder or any other physical characteristic with respect to the use of fixed pictures or a succession of fixed pictures. This profile is formalized by a digital file or a digital table that can be used by computer means and is located in the server and/or the decoder box of the client.

This invention remedies the disadvantages of the prior art by providing a system for the adaptive and progressive descrambling of the content viewed as a function of the profile and of the rights of the users.

An adaptive and progressive descrambling of the content viewed is applied as a function of the profile and the rights of each user. The server sends only the parts of the complementary information that has a structure characterized by a "granular scalability" for supplying the user with a content more or less scrambled as a function of certain criteria, profiles and rights. The digital streams encoded in wavelets have the properties of granular scalabilities that are spatial, qualitative and in resolution.

The granularity of the complementary information is relative to the degree of scrambling. For example, the fixed pictures are completely scrambled once for all the users. Then, the server sends all or part of the complementary information in such a manner that the picture or the succession of fixed pictures appears more or less scrambled to the user. The transmitted content of the complementary information and a content viewed on the viewing screen of the user are functions of each client and the server manages and carries out the sending in real time at the moment of the viewing by each user.

In a general sense, the invention relates to a process for the secured distribution of digital fixed pictures in the form of streams comprising sequences of data each containing a part of the information of the picture, which process comprises a stage for modification of the original stream by modifying at least a part of the data sequences, which modification produces a stream modified in the same nominal format as the original stream, and which process comprises a stage for transmission of the modified stream and a stage for reconstruction with the aid of a decoder in the addressed equipment, characterized in that reconstruction is adaptive and progressive as a function of information coming from a digital profile of the addressed user.

The modification advantageously produces a modified main stream and complementary information permitting reconstruction of the original stream by a decoder, which process comprises a stage for transmission of the modified stream and also comprises a stage for transmission to the addressed equipment of a subset of the modification complementary information, which subset is determined as a function of information coming from a digital profile of the addressee.

This modification advantageously produces a modified main stream and complementary information permitting reconstruction of the original stream by a decoder, which process comprises a stage for transmission of the modified stream and also comprises a stage for transmission to the addressed equipment of a subset of the modification complementary information, which subset is determined as a function of information coming from a hardware profile of the addressee.

Furthermore, this original stream is coded in accordance with a process for coding in wavelets. The original stream advantageously has a property of scalability in resolution. The original stream also advantageously has a property of spatial scalability. The original stream further advantageously has a property of qualitative scalability. The original stream still further advantageously has a property of spectral scalability.

In a variant, the modified main stream is available on the addressed equipment prior to transmission of the complementary information to the addressed equipment. According to a variant, part of the modified main stream is available on the addressed equipment prior to transmission of the complementary information to the addressed equipment. In another variant, the modified main stream and the complementary information are transmitted together in real time.

Determination of the subset of the complementary information is advantageously based on the scalability properties of this original stream. Determination of the subset of the complementary information is advantageously based on the properties of granular scalability of the complementary information.

Furthermore, the quantity of information contained in the subset corresponds to a level of scalability determined as a function of the profile of the addressee. The type of information contained in the subset corresponds to a level of scalability determined as a function of the profile of the addressee.

This complementary information advantageously comprises at least one digital routine suitable for executing a function. The functions transmitted to each addressee are advantageously personalized for each addressee as a function of the session. According to a variant, the complementary information is encrypted in advance for each addressee as a function of the session. According to a variant, the complementary information is subdivided into at least two subparts.

According to an embodiment, the subparts of the complementary information are distributed by different media. According to another embodiment, the subparts of the complementary information are distributed by the same medium.

In a variant, all or part of the complementary information is transmitted on a physical vector. In another variant, the complementary information is transmitted on-line.

The type of information contained in the subset is advantageously updated as a function of the behavior of the addressee during the connection to the server or as a function of habits or as a function of data communicated by a third party. The quantity of information contained in the subset is advantageously updated as a function of the behavior of the addressee during the connection to the server or as a function of habits or as a function of data communicated by a third party.

Furthermore, the process comprises a prior stage of analog/digital conversion in a structured format, which process is applied to an analog signal. According to a variant, a prior stage transcodes the digital stream from any format to a format with scalability properties.

The fixed pictures advantageously constitute a succession of pictures fixed in time.

According to an embodiment, modification of the data sequences is different for at least two pictures of the succession of pictures. According to another embodiment, modification of the data sequences of a picture of the succession of pictures includes modification of the data sequences of the preceding pictures in the temporal order of the succession based on the properties of spatial and qualitative scalability of the transformations in wavelets.

The granular scalability of the complementary information constituted of the subsets is advantageously based on the qualitative, spatial and in-resolution scalabilities of the streams stemming from a transformation in wavelets of the pictures. Moreover, the process is without loss of quality.

According to a particular variant, the invention also concerns processing of fixed pictures, e.g., pictures compressed in accordance with the JPEG2000 norm. In that case, it concerns a process for the secured distribution of fixed digital pictures, providing that during reconstruction of the original stream an indelible and imperceptible trace is inserted in the original stream, which trace carries a non-ambiguous identifier.

According to a variant, an indelible and imperceptible trace is inserted in the picture after reconstruction and decoding of the original stream, which trace carries a non-ambiguous identifier.

According to an exemplary embodiment, the indelible and imperceptible trace can be detected by an adequate software that analyzes the reconstituted content.

This non-ambiguous identifier preferably authenticates the user. According to a variant, the non-ambiguous identifier authenticates the equipment on which the reconstruction algorithm of the original stream was executed. According to another variant, the non-ambiguous identifier identifies the session opened by the user during the course of which reconstitution of the original stream is executed.

The scrambling and descrambling sessions are advantageously realized under the control of a secured server playing the part of trusted third party. According to a particular embodiment, the session is identified by a secured server with a register comprising for each session information about the session number, the identifier of the user or the identifier of the user equipment, the identifier of the content constituting the subject matter of the session and of a date-time group.

According to another embodiment, a digital signature is calculated from the reconstituted stream, the inserted trace generates a unique and different signature for each reconstituted stream and the signature is stored on a secured server playing the part of trusted third party.

The stream reconstituted by the descrambling preferably has the same visual quality as the original stream and exists in a usable form only if it carries the trace.

The stream reconstituted by descrambling advantageously exists in a usable form only if the digital signature extracted during an authenticity control stage is identical to the signature stored on the secured server playing the part of trusted third party.

The invention is advantageously applied to an audiovisual digital stream stemming from a proprietary norm or standard.

The invention also concerns a system for secured distribution of fixed digital pictures comprising a server comprising means for broadcasting a modified stream, and a plurality of equipment provided with a descrambling circuit, which server also comprises means for recording the digital profile of each addressee and means for analyzing the profile of each of the addressees of a modified stream, which means controls the nature of the complementary information transmitted to each of these addressees.

Finally, the invention relates to a system for secured distribution of fixed digital pictures in which the level (quality, quantity, type) of the complementary information is determined for each addressee as a function of the state of a profile at the moment of viewing the main stream.

The invention will be better understood with the aid of the following description, presented purely by way of explanation, of an embodiment of the invention with reference made to the attached FIGURE which illustrates a particular embodiment of the client-server system in conformity with the invention.

The digital pictures are obtained with the aid of compression technologies based on wavelets (e.g., the fixed pictures in the JPEG-2000 norm, MPEG-4, JJ2000, JASPER, Kakadu, moving JPEG-2000). The concept of wavelets is an iterative scheme, that is to say, the repetition of one and the same operation of filtering at weaker and weaker resolutions that generates streams characterized by a spatial, qualitative and in-resolution scalability. The original stream is reconstituted on the addressed equipment from the modified main stream and from the complementary information. The complementary information is divided into subsets and as a function of the user profile and one subset, several subsets or all of the complementary information is/are sent for partial or total descrambling of the pictures.

The complementary information sent to the user is advantageously encrypted prior to being sent with the aid of a key specific for each user.

The quantity of information contained in the subset is defined as the number of data and/or functions belonging to the complementary information sent to the addressee during the connection.

The type of information contained in the subset corresponds to a level of spatial, qualitative and in-resolution scalability determined as a function of the profile of the addressee. "Type" is defined as the nature of the data and/or functions belonging to the complementary information sent to the addressee during the connection to the server. For example, the type of data is relative to the habits of the addressee (complete subscription, partial subscription, payment by card, time of connection, duration of connection, regularity of the connection and of payments), of the environment (lives in a big city, the time at this moment), and to characteristics (age, sex, religion, community).

The complementary information is advantageously constituted of a succession of subsets, each of which corresponds to a level of scalability defined in the original stream.

The complementary information is composed of at least one function and the functions are personalized for each addressee relative to the connection session. A session is defined from the time of connection, the duration, the type of the first stream viewed and the connected elements (addressees, servers).

This complementary information is subdivided into at least two subparts, each of which can be distributed by different media or by the same medium. For example, in the case of the distribution of the complementary information by several media a more complex management of the rights of the addressees can be ensured.

The transformation of the picture into wavelets (two-dimensional spatial signal) consists of applying a succession of high-pass and low-pass filters onto the original image that are worked up from the characteristics of the analysis wavelets. The operation of synthesis, that consists of reconstructing the picture from all or from a subset of the wavelets coefficients generated by the transformation follows a scheme of inverse filtering.

Application of a stage of wavelet transformation onto a digital image (that can be composed of one or several matrices with real or whole values) is equivalent to an operation of filtering on the lines and the columns of a matrix or of matrices of values followed by a dyadic diminution (division by two) of the size. Thus, it generates 4 new matrices of wavelet coefficients at each stage that are called "subbands" and whose width and height are equal to one half the width and height of the transformed matrix (dyadic progression). Assuming a picture I with width L, height H and resolution R, the application of a wavelet transformation state therefore generates 4 matrices of wavelet coefficients with the dimension (L/2, H/2): the subband $LL_{R-1}$, result of a horizontal (lines) and vertical (columns) low-pass filtering on the I picture, the subband $LH_{R-1}$, result of a horizontal low-pass and vertical high-pass filtering, the subband $HL_{R-1}$, result of a horizontal high-pass and vertical low-pass filtering, and the subband $HH_{R-1}$, result of a horizontal and vertical high-pass filtering.

Consider the transformation into wavelets at R levels (equivalent to R stages) of a picture: A wavelet transformation at R levels is associated with R+1 levels of resolution numbered from R to 0 with R and 0 corresponding respectively to the finest levels of resolution (initial picture) and the coarsest (approximate picture). Each subband stemming from the decomposition into wavelet of picture I is identified by its orientation (LL or HL or LH or HH) and its corresponding resolution level (comprised between 0 and R−1).

The original picture can be considered as the band $LL_R$. At each level I of the decomposition into wavelets (except the last i=0), the subband $LL_i$ is thus decomposed into 4 new subbands $LL_{i-i}$, $HL_{i-i}$, $LH_{i-i}$ and $HH_{i-i}$, and whose size is divided by two relative to $LL_i$. The process is iterated until subband $LL_0$ is obtained. Thus, for a wavelet transformation at R levels, 3R+1 subbands of wavelet coefficients are generated: $LL_0$, $HL_0$, $LH_0$, $HH_0$, $HL_1$, $HH_1$, . . . , $HL_{R-1}$, $LH_{R-1}$, $HH_{R-1}$.

Reconstruction of the picture (synthesis) from the 3R+1 subbands of coefficients consists of applying an operation of inverse filtering to the wavelet coefficients followed by a dyadic augmentation of the size. A progressive reconstruction of the picture according to different resolution levels can thus be carried out. For example, by adding the 3 subbands of wavelet coefficients $HL_{r-1}$, $LH_{r-1}$, $HH_{r-1}$ in the synthesis operation to the picture reconstructed from resolution r−1, a new picture with resolution r is obtained.

The single/subband of wavelet coefficients $LL_0$ is an approximation of the original picture $LL_R$ of which the resolution is $2^R$ times less than the original image.

As for the 3R subbands of wavelet coefficients $HL_{r-1}$, $LH_{r-1}$, $HH_{r-1}$, ($\gamma \in [1,R]$), they correspond to details in the picture, extracted at resolution level r−1. The greater r is, the more the wavelet coefficients of the subbands are characteristic of finer and finer details in the original image.

The wavelet coefficients stemming from the wavelet transformation of a picture are the spatially local characteristics of frequency information. The more r diminishes, the more the spatial zone characterized by a single wavelet coefficient increases (multiplication by a factor of 4 at each step).

A transformation into wavelets at R levels of a picture generates a "picture" called approximately lower resolution $2^R$ and 3R "pictures" called details at different resolutions (0 to R).

Consequently, a binary stream offering a granular scalability can be represented in the following form: $\{B_0, B_1, \ldots, B_{Ntot}\}$. Each $B_1$ represents a subset of bits and the binary stream can then be described as a sequence of subsets $B_1$ of binary symbols. Thus, a binary stream from a coding in wavelets has the property of "qualitative granular scalability" if and only if:

The decoding of n (n<Ntot where the binary stream is described as a sequence of Ntot subsets Bi) subsets of bits $B_0, B_1, \ldots, B_n$ implies a decoded picture $I_d$ with quality $Q_n$, which quality is measured relative to the original picture I according to a predefined metric M calculated from subjective and/or objective elements, that is to say, $Q_n = M(I_d(n), I)$.

When m (m<n) subsets $B_1$ are decoded, $\{B_0, B_1, \ldots, B_m\}$, then $Q_m < Q_n$.

When p (p>n, P<N) subsets $B_1$ are decoded, $\{B_0, B_1, \ldots, B_m, \ldots, B_n, \ldots, B_p\}$, then $Q_n < Q_p$.

When the Ntot subsets $B_1$ are decoded, $Q_{Ntot}$ is maximum and $Q_{Ntot} \geq Q_1$ for 0<I≦Ntot.

Likewise, a binary stream stemming from a coding in wavelets has the property of "scalability in resolution" if and only if:

The decoding of n (n<Ntot) subsets of bits $\{B_0, B_1, \ldots, B_n\}$ implies a picture $I_d$ with resolution $R_n$.

When m (m<n) subsets $B_1$ are decoded, $\{B_0, B_1, \ldots, B_m\}$, then $R_m < R_n$.

When p (p>n, p<Ntot) subsets $B_1$ are decoded, $\{B_0, B_1, \ldots B_m, \ldots, B_n, \ldots, B_p\}$, then $R_n < R_p$.

When the Ntot subsets $B_1$ are decoded, $R_{Ntot}$ is maximum and $R_{Ntot} > R_i$ for 0<I≦Ntot.

For example, a picture was scrambled by modifying (modification of the type addition/subtraction of noise, thresholding, pennutation" a subset including N wavelet coefficients relative to one or several spectral components of the picture and/or belonging to one or several regions of interest in the original picture or to the entire picture and/or relative to different levels of resolution in the wavelet decomposition (from 0 to R−1) and/or belonging to one or several subbands (among LL, HL, LH and HH).

The adaptive and progressive descrambling of the picture consists of progressively descrambling the picture in several stages: First, $n_0$ (0 <$n_0$<Ntot) wavelet coefficients modified by their original values are placed, then $n_1$ (0 <$n_1$<Ntot) such as:

$$n_0 + n_1 + \ldots + n_p = Ntot.$$

The descrambling is adapted to the behavior of the client during the connection to the server as a function of the scrambling method used and the client profile.

An example of progressive descrambling will now be described. In this example, the Ntot modified wavelet coefficients belong to subbands HL, LH and HH corresponding to 4 different levels of resolution (i.e., r, r+1, r+2, r+3). It consists of first replacing the $n_0$ wavelet coefficients belonging to subbands $HL_r$, $LH_r$, and $HH_r$, then the $n_1$ wavelet coefficients belonging to subbands $HL_{r+1}$, $LH_{r+1}$ and $HH_{r+1}$, then the $n_2$ wavelet coefficients belonging to subbands $HL_{r+2}$, $LH_{r+2}$ and $HH_{r+2}$, and finally the $n_3$ wavelet coefficients belonging to subbands $HL_{r+3}$, $LH_{r+3}$ and $HH_{r+3}$. The first descrambling stage (replacement of the $n_0$ coefficients) attenuates in resolution and in extent the effects of the initial scrambling (suppression of the scrambling of the details of resolution r), but the details belonging to the upper levels of resolution (r+1, r+2 and r+3) are still degraded. The following stages attenuate the scrambling more and more to finally achieve a complete descrambling. This example is purely illustrative and should not be considered as limiting. The number of resolution levels affected by the initial scrambling can be comprised between 1 and R+1. Therefore, as a function of this number, the maximum number of descrambling stages can be comprised between 1 and R+1.

Another variant is to send ni coefficients belonging to subbands $HL_{r+1}$, $LH_{r+1}$ and $HH_{r+1}$ in several substages, thus increasing the number of progressive descrambling stages.

Another means of progressive descrambling consists of restoring the original wavelet coefficients relative to one of the C spectral components of the picture, then to two of the C components and so forth until the complete restoring of the original wavelet coefficients relative to the C components. One can then speak of progressive spectral descrambling. The number of descrambling stages also varies between 1 and C as a function of the number of components initially scrambled (between 1 and C).

According to an alternative embodiment, the progressive descrambling of a scrambled picture consists of restoring the original wavelet coefficients belonging to a spatial zone predefined in the picture while maintaining a total scrambling of the rest of the picture. Assume (L, H) the dimension of the original picture and (l, h) the dimension of the zone of interest to be descrambled on the original picture. It is supposed in this example that this zone is situated in the center of the picture, but this zone can be defined anywhere in the original picture.

Assuming r is the level of resolution of the subband of wavelet coefficients to be restored, then the following formulas indicate the intervals [is, js] and [ie, je] of the indexes of the wavelet coefficients to be restored in the subbands of resolution r considered:

$$is=nlr/2-(l/js=ncr/2-(h/2^{r+1}),2^{r+1}),$$

$$ie=nlr/2+(1/2^{r+1}), je=ncr/2+(h/2^{r+1}),$$

where nlr, ncr are respectively the number of lines and columns of the matrix of the wavelet coefficients in the subband considered. The progressive descrambling of the zone of interest is realized by successively restoring the original wavelet coefficients of each subband for each resolution: For example, $LL_0$, then $HL_1$, $LH_1$, $HH_1$, then $HL_2$, $LH_2$, $HH_2$ and so forth until $HL_{r-1}$, $LH_{r-1}$ and $HH_{r-1}$.

According to another embodiment, the progressive descrambling consists of first restoring the original wavelet coefficients belonging to subband LL, then the original wavelet coefficients belonging to all the LH subbands, then the original wavelet coefficients belonging to all the HL subbands and finally the original wavelet coefficients belonging to all the HH subbands. Thus, scrambling the details is progressively attenuated according to their orientations. The order of the types of subbands for which the wavelet coefficients are restored can advantageously be modified.

The invention will be better understood from a reading of an exemplary embodiment concerning a stream with the JPEG-2000 format. In this example, the invention modifies the value of certain fields, especially the information necessary for a decoder for the reconstitution of the original stream.

The FIGURE in the attached drawing represents a particular preferred embodiment of the client-server system in conformity with the invention.

The original stream 11 can be directly in digital form 111 or in analog form 101. In the latter instance, analog stream 11 is converted by a coder (not shown) into a digital stream 111. In the remainder of the text "1" denotes the digital input stream corresponding to the fixed picture. The JPEG-2000 stream to be secured 1 is sent to an analysis and scrambling system 121 that generates a modified main stream 122 in the same JPEG-2000 format, a format identical to input stream 1 except that the values of certain elements of the stream have been replaced by values different from the original ones, and is placed in an output buffer memory. Complementary information 123 in any format and organized in layers of granular scalability contains information relative to the elements of the pictures that have been modified, replaced, substituted or shifted, as well as their value or emplacement in the original stream and has several subsets relative to its property of granular scalability.

The stream in JPEG-2000 format 122 is transmitted via telecommunication network 4 of the microwave, cable, satellite, etc, type to terminal 8 of the user and more precisely into its memory or onto its hard disk 85. When the user wishes to display fixed pictures present in the user's terminal, terminal 8 makes the request to display the fixed pictures present in its memory or on its hard disk 85. Server 12 verifies the rights of the user for the request. To achieve this, the server can use the data of the user contained in a database connected to server 12 and/or use a system based on a smartcard 82 connected to synthesis system 87. Two possibilities then exist.

If the user does not have all the rights necessary to view the image, in which case JPEG-2000 stream 122 generated by scrambling system 121 present in the memory or on hard disk 85 is sent to synthesis system 87 via reading buffer memory 83. Synthesis system 87 does not modify it and transmits it identically to classic JPEG-2000 reader 81 and its content, degraded visually by scrambling system 121, is displayed on viewing screen 6. The user of terminal 8 thus sees a scrambled picture.

Alternatively, the user has the rights to view the picture. In this case, the synthesis system addresses a viewing request to server 12 containing the information 123 necessary for recovery of the original picture 101. Server 12 then sends, via telecommunication networks of the analog or digital telephone line, DSL (digital subscriber line) or BLR (local radio loop) type, via DAB (digital audio broadcasting networks or via digital mobile telecommunication networks (GSM, GPRS, UMTS) 5, at least one subset of complementary information 123 permitting reconstitution of the picture in terminal 8, which stores this subset in buffer memory 86. Synthesis system 87 then proceeds to the restoration, in the scrambled JPEG-2000 stream that it reads in reading buffer memory 83, of the modified fields for which it knows the positions as well as the original values by virtue of the content of the complementary information read in buffer memory 86 for the descrambling of the picture. The quantity of information contained in complementary information 123 and sent to the descrambling system is specific, adaptive and progressive for each user and is a function of his rights, e.g., single or multiple use, right to make one or more private copies, delay in payment or payment in advance. To determine the quantity of information of complementary information 123 to send to terminal 8, server 12 consults the rights of the user in advance.

According to an embodiment, a progressive descrambling of a picture for which the Ntot modified wavelet coefficients belong to subbands HL, LH AND HH corresponding to 4 different levels of resolution (that is to say, r, r+1, r+2, r+3) consists of first replacing the $n_0$ wavelet coefficients belonging to subbands $HL_r$, $LH_r$, and $HH_r$, then the $n_1$ wavelet coefficients belonging to subbands $HL_{r+1}$, $LH_{r+1}$ and $HH_{r+1}$, then the $n_2$ wavelet coefficients belonging to subbands $HL_{r+2}$, $LH_{r+2}$ and $HH_{r+2}$, and finally the $n_3$ wavelet coefficients belonging to subbands $HL_{r+3}$, $LH_{r+3}$ and $HH_{r+3}$. The first descrambling stage (replacement of the $n_0$ coefficients) attenuates in resolution and in extent the effects of the initial scrambling (suppression of the scrambling of the details of resolution r), but the details belonging to the upper levels of resolution (r+1, r+2 and r+3) are still degraded. The following stages attenuate the scrambling more and more to finally achieve a complete descrambling. The number of resolution levels affected by the initial scrambling is comprised between 1 and R+1 as a function of the number of resolution levels R selected for scrambling the stream. Therefore, the number of descrambling stages is comprised between 1 and R+1 as a function of this number. In this embodiment, sending a subset of the complementary information containing the $n_0$ coefficients is carried out when the user connects, selects and downloads the desired picture. The picture selected is then displayed on a partially descrambled screen because it is calculated from the $n_0$ coefficients transmitted to the user terminal. If the user decides to see the picture in accord-nee with a higher resolution, the server proposes to the user that the user pay a predetermined sum. If the user pays immediately by a classic remote payment means (credit card, . . .), the server sends a second subset of the complementary information containing the n1 coefficients. During the payment transaction the subsets of the complementary information concerning the following descrambling stages are sent and attenuate the scrambling more and more to finally achieve a complete descrambling and the displayed picture is identical to the original picture. If the client does not pay immediately, the coefficients will be sent progressively as a function of the arrival of the payment. In each transaction, the server records the behaviors of the user and re-updates a profile in a database as a function of these behaviors.

The sent content of the complementary information 123 and the content visualized on the viewing screen of the client are functions of each client and the server manages and carries out sending the subsets in real time at the moment of viewing for each user, e.g., as a function of the price that the client is ready to pay.

Assume that fixed pictures are stored on the server with 10 different resolutions from R=1 to R=10, R=10 being the maximum resolution. If a client has a habit of ordering pictures with an average resolution, the subscription corresponds to the descrambling obtained with R=5. If the client wishes to obtain a high-resolution, e.g., a descrambling for R=7, the client must change the payment or subscription type. The client can then obtain, if desired, and by means, e.g., of a new payment the resolution R=8, then R=9 and finally R=10. All these operations are managed by server 12 as a function of the behavior of each user and by using a database connected to server 12.

Likewise, another client who needs high-resolution pictures will take the subscription corresponding to the maximum resolution for R=10. If the client has a delay in payment, the server will automatically send pictures descrambled for R=6, e.g., to remind the client to pay.

As has been described, the level (quality, quantity, type) of complementary information is determined as a function of each addressee, as a function of the state of the profile at the moment of transmission of the main stream and at least part of the profile is stored on addressee equipment. For example, in the attached drawing, part of the user profile is recorded on smartcard 82 connected to synthesis system 87 such as, e.g., the digital data concerning the frequency of connections or the regularity of payments. This same data and/or the rest of the profile can be located on server 12. The remainder of the profile can contain, e.g., the type of pictures that the user prefers.

In a variant, the profile of the addressed is updated. The updating also depends on the time of the connection to the server (data relative to the behavior), namely, whether the client connects regularly (referring to his habits). Likewise, the profile of the addressee can be updated as a function of data recovered in a consumer database already existing on a server and relative to the client.

According to another exemplary embodiment the server transmits all or part of the complementary information to the user during several seconds of displaying the picture, then transmits fewer and fewer subsets of the complementary information in the course of time. Thus, descrambling the picture is less and less complete, thus giving the effect to the user that the picture displayed on the screen is becoming less and less comprehensible, therefore more and more scrambled. This functionality incites the user to purchase the rights to see the completely descrambled picture, given that the user has partially seen the content.

According to another embodiment, all or part of complementary information 123 is transmitted to the user on a physical vector such as a memory card or a smartcard 82.

According to another embodiment, only part of the modified main stream is available on the equipment of the addressee: If the characteristics of viewing screen 6 only permit the displaying of a restricted number of resolutions (R=1 to R=5), the user only needs to recover part of the modified main stream 122. A part of the complementary information permits viewing the picture only in resolutions R=1 to R=5 will be sent by server 12 to user terminal 8 as a function of the profile and the rights of the user.

The example described below represents another preferred embodiment of the progressive and adaptive descrambling for digital pictures of stemming from the JPEG-2000 norm.

Analysis and scrambling module 121 generates complementary information 123 and sends it to the equipment of the addressee via network 5. Network 5 advantageously comprises a secure server on which complementary information 123 is stored. Module 121 also generates modified main stream 122 in the JPEG-2000 format, that is transmitted to hard disk 85 of the addressed equipment of the client by network 4. Network 4 advantageously comprises a multimedia server on which modified main stream 122 is stored. Scrambling module 121 also inserts into the meta-data of the modified main stream the identifier of the complementary information corresponding to the modified main stream and the physical address of secure server 5 on which the complementary information is stored.

The complementary information is characterized by the presence of the subsets corresponding to several layers of scalability, e.g. to the number of four. The first subset contains all the complementary information relative to the high quality of the original picture. The second subset contains a part of the complementary information relative to an acceptable quality. The third subset contains a part of the complementary information relative to a low quality while the image remains still visible, but unusable. The fourth subset contains just the part of the complementary information corresponding to a minimum quality and the picture is poorly visible.

During reconstitution of the original stream, descrambling module 87 inserts an indelible trace imperceptible to the human eye into the reconstituted stream which trace carries a non-ambiguous identifier. The trace inserted into the stream can be detected by an adequate software that has the ability to analyze the reconstituted content. Insertion of this trace and descrambling are carried out in a sequential and progressive manner in such a manner that a stream that was scrambled by analysis and scrambling system 121 and then descrambled by module 8 exists in a form that can be used only if it comprises the non-ambiguous trace. During descrambling and the sequential insertion of the trace, reconstitution is performed in such a manner that the trace is inserted progressively during the progressive descrambling. At the end of the descrambling the protection is ensured by the trace, that is substituted for the protection obtained by scrambling.

An indelible trace imperceptible to the human eye is advantageously inserted into the picture after decoding the reconstituted stream.

A protected stream with scrambling module 12 and descrambled with this variant of descrambling module 87 is advantageously always a carrier of a protection: whether invisible, stemming from insertion of the identifying trace, or whether visible, stemming from the adaptive and progressive descrambling.

The non-ambiguous identifier carried by the trace is advantageously relative to the identification of the interactive session opened by the user. The role of the non-ambiguous identifier is authentication of the user, of the addressed equipment on which the picture is reconstructed and/or of the session opened by the user.

According to an embodiment, during the descrambling stage, the stream is reconstituted and an indelible and imperceptible trace is inserted. A digital signature of the reconstituted stream is then calculated, which signature is unique and different for each stream reconstituted by insertion of the trace and the signature is stored on a secure server playing the part of a trusted third party.

The reconstituted stream advantageously exists in usable form only if the signature extracted during an authenticity check stage is identical to the signature stored on the secure server during the reconstitution.

The session is characterized by a number assigned by secure server 5 that plays the part of trusted third party between the user and the adaptation of the parameters characterizing the descrambling type. Secure server 5 assigns a specific number to each session that is backed up in a register. The information comprised in the register is the session number constructed from the identifier of the user or the identifier of equipment 8, the identifier of the content of the picture constituting the subject matter of the session and of a date-time group in the ISO standard.

Identification of the content of the picture is made by descrambling module 87 that restores from the meta-data of the modified main stream the identity of the complementary information relative to the modified main stream and the physical address of network 5 where the secure server is located on which the complementary information is stored.

Reconstitution of the original picture is carried out in several stages. During establishment of the session, descrambling module 87 reads the identifier of the complementary information and the URL of secure server 5 in the meta-data of the modified main stream. Server 5 first sends a fourth subset of the complementary information that produces a picture of minimal quality, which picture can not be used and is poorly visible. This stage serves to confirm the identity of secure server 5. The second stage sends to the descrambling module a third subset of the complementary information that renders the picture visible, but still non-usable. This stage is necessary so that the client can decide whether to obtain rights for using the picture by viewing an outline of its contents. The client is sent a second subset (corresponding to an acceptable quality) or a first subset (corresponding to a maximum quality) of the complementary information by means of the payment corresponding to the required quality as a function of the desire to obtain an acceptable or a maximum quality of the picture. A non-ambiguous trace is always present in the reconstituted stream independently of the subset used for descrambling. The trace is intended to protect the intellectual property in conformity with the WIPO treaty (World Organization of Intellectual Property) of December 1996 stipulating that the data intended for the protection of intellectual property can be digital data.

The embodiments described above are merely examples and do not constitute a limitation on the scope of the invention as defined in the appended claims.

The invention claimed is:

1. A process for secured distribution of at least one digital fixed picture in an original stream, wherein the picture includes sequences of data that respectively contain a part of information of the picture, the original stream being in a nominal compressed block format based on wavelets, and the original stream including wavelet coefficients, the process comprising:

modifying the original stream by modifying the wavelet coefficients to produce a modified stream having the same nominal block format as the original stream;

generating complementary information including modified information from the original stream, the complementary information also including one or more functions for reconstructing the original stream with the modified information, wherein a respective one of the one or more functions contains at least one instruction relating data associated with the complementary information and/or the modified stream and one or more operators associated with reconstructing the original stream from the modified stream; and separately transmitting the modified stream and the complementary information to an addressee equipment for reconstruction of the original stream from the modified stream and the complementary information, wherein the reconstruction is adaptive and progressive as a function of information associated with a digital profile of the addressee equipment provided in the complementary information.

2. The process according to claim 1, wherein the modifying comprises producing a modified main stream and the complementary information permitting reconstruction of the original stream by a decoder;

the generating comprises determining a subset of the complementary information as a function of information derived from a digital profile of the addressee equipment; and the transmitting comprises transmitting to the addressee equipment the subset of the complementary information.

3. The process according to claim 1, wherein the modifying comprises producing a modified main stream and complementary information permitting reconstruction of the original stream by a decoder;

the generating comprises determining a subset of the complementary information as a function of information derived from a hardware profile of the addressee equipment; and the transmitting comprises transmitting to the addressee equipment the subset of the complementary information.

4. The process according to claim 1, wherein the original stream has a property of scalability in resolution.

5. The process according to claim 1, wherein the original stream has a property of spatial scalability.

6. The process according to claim 1, wherein the original stream has a property of qualitative scalability.

7. The process according to claim 1, wherein the original stream has a property of spectral scalability.

8. The process according to claim 1, wherein the transmitting further comprises transmitting the modified main stream to the addressee equipment prior to transmitting the complementary information to the addressee equipment.

9. The process according to claim 1, wherein the transmitting further comprises transmitting part of the modified main stream to the addressee equipment prior to transmitting the complementary information to the addressee equipment.

10. The process according to claim 1, wherein the transmitting further comprises transmitting the modified main stream and the complementary information together in real time.

11. The process according to claim 2, wherein determining a subset of the complementary information includes determining the subset based on scalability properties of the original stream.

12. The process according to claim 2, wherein determining a subset of the complementary information includes determining the subset based on properties of granular scalability of the complementary information.

13. The process according to claim 2, further comprising determining a quantity of information contained in the subset based on a level of scalability determined as a function of a profile of the addressee equipment.

14. The process according to claim 2, further comprising determining information contained in the subset based on a level of scalability determined as a function of a profile of the addressee equipment.

15. The process according to claim 2, wherein generating complementary information includes generating complementary information that comprises at least one digital routine suitable for executing a function.

16. The process according to claim 1, wherein the transmitting further comprises transmitting the functions to addressee equipment which functions are customized for the addressee equipment as a function of a session.

17. The process according to claim 1, wherein the generating further comprises encrypting the complementary information for addressee equipment as a function of a session.

18. The process according to claim 1, wherein the generating further comprises subdividing the complementary information into at least two subparts.

19. The process according to claim 18, wherein the transmitting further comprises transmitting the subparts by different media.

20. The process according to claim 18, wherein the transmitting further comprises transmitting the subparts by the same medium.

21. The process according to claim 1, wherein the transmitting further comprises transmitting all or part of the complementary information on a physical vector.

22. The process according to claim 1, wherein the transmitting further comprises transmitting the complementary information on-line.

23. The process according to claim 2, wherein the determining comprises updating information contained in the subset as a function of behavior of the addressee equipment during connection to a server or as a function of habits or as a function of data communicated by a third party.

24. The process according to claim 2, wherein the determining comprises updating the quantity of information contained in the subset as a function of behavior of addressee equipment during connection to a server or as a function of habits or as a function of data communicated by a third party.

25. The process according to claim 1, further comprising analog/digital converting data in a structured format, which is applied to an analog signal.

26. The process according to claim 1, further comprising transcoding a digital stream from any format to a format with scalability properties.

27. The process according to claim 1, wherein a plurality of digital fixed pictures constitute a succession of digital pictures.

28. The process according to claim 1, wherein the modifying comprises applying different modifications of the data sequences for at least two pictures of a succession of pictures.

29. The process according to claim 28, wherein the applying different modifications of the data sequences of a picture of a succession of pictures include modifying the data sequences of preceding pictures in temporal order of the succession based on properties of spatial and qualitative scalability of transformations in wavelets.

30. The process according to claim 1, wherein granular scalability of the complementary information is based on qualitative, spatial and in-resolution scalabilities of streams stemming from a transformation in wavelets of the pictures.

31. The process according to claim 1, wherein the process is performed without loss of picture quality.

32. The process according to claim 1, further comprising inserting, during reconstruction of the original stream, an indelible and imperceptible trace into the reconstructed original stream, which trace carries a non-ambiguous identifier.

33. The process according to claim 1, further comprising inserting, after reconstruction of the original stream, an indelible and imperceptible trace into the reconstructed original stream, which trace carries a non-ambiguous identifier.

34. The process according to claim 32, further comprising detecting the indelible and imperceptible trace by software that analyzes reconstructed original stream.

35. The process according to claim 32, further comprising authenticating a user with the non-ambiguous identifier.

36. The process according to claim 32, further comprising authenticating addressee equipment on which an reconstruction algorithm for reconstructing the original stream was executed with the non-ambiguous identifier.

37. The process according to claim 32, further comprising identifying a session opened by a user during the course of which reconstitution of the original stream is executed with the non-ambiguous identifier.

38. The process according to claim 37, further comprising realizing a scrambling session and descrambling session under control of a secured server disguised as a selected third party.

39. The process according to claim 37, further comprising identifying the session by a secured server with a register that is configured to store for the session: an identifier associated with the session, an identifier of a user or identifier of addressee equipment, and an identifier associated with subject matter of the session, and an identifier representing a date-time group.

40. The process according to claim 32, further comprising calculating a digital signature from the reconstructed original stream, wherein the inserted trace generates a unique and respective signature for different ones of the reconstituted streams, and the signature is stored on a secured server playing disguised as a selected third party.

41. The process according to claim 32, wherein a stream reconstituted by descrambling has the same visual quality as the original stream and exists in a usable form only if it carries said trace.

42. The process according to claim 32, wherein a stream reconstituted by descrambling exists in a usable form only if a digital signature extracted during an authenticity control is identical to a signature stored on a secured server.

43. The process according to claim 32, wherein the process is applied to an audiovisual digital stream that is coded according to a proprietary norm or standard.

44. The process according to claim 1, further comprising determining a respective level of the complementary information for at least one instance of addressee equipment based upon a state of a profile associated with the addressee equipment.

* * * * *

UNITED STATES PATENT AND TRADEMARK OFFICE
CERTIFICATE OF CORRECTION

| | | |
|---|---|---|
| PATENT NO. | : 7,926,083 B2 | Page 1 of 1 |
| APPLICATION NO. | : 10/542963 | |
| DATED | : April 12, 2011 | |
| INVENTOR(S) | : Lecomte et al. | |

It is certified that error appears in the above-identified patent and that said Letters Patent is hereby corrected as shown below:

Title page, item (57), under "Abstract", in Column 2, Line 5, delete "produces" and insert -- produce --.

Column 1, line 10, delete "2004(WO" and insert -- 2004 (WO --.

Signed and Sealed this
Ninth Day of August, 2011

David J. Kappos
*Director of the United States Patent and Trademark Office*